Patented Sept. 15, 1925.

1,553,495

UNITED STATES PATENT OFFICE.

GILBERT C. BACON, OF STAMFORD, CONNECTICUT, ASSIGNOR TO ATLAS POWDER COMPANY, OF WILMINGTON, DELAWARE, A CORPORATION OF DELAWARE.

PROCESS OF TREATING NITROCELLULOSE TO REDUCE ITS VISCOSITY.

No Drawing. Original application filed June 20, 1922, Serial No. 569,722. Divided and this application filed July 14, 1922. Serial No. 575,057.

*To all whom it may concern:*

Be it known that GILBERT C. BACON, citizen of the United States, residing at Stamford, in the county of Fairfield and State of Connecticut, has invented certain new and useful Improvements in Processes of Treating Nitrocellulose to Reduce its Viscosity, of which the following is a specification.

This invention relates to a process of treating nitrocellulose to reduce its viscosity and this application is a division of my copending application Serial Number 569,722, filed on June 20, 1922. The application referred to had to do with the treatment of a wide range of nitrocellulose products, including the newly nitrated cotton, celluloid and cellulose scrap, smokeless powder and the like with heat or heat and pressure, either with the said nitrocellulose products in a dry state or in a liquid of low solvent power. By such treatment with heat or heat and pressure, the nature of the nitrocellulose product is permanently modified in such manner that when it is thereafter used as a base for a nitrocellulose solution, such as a lacquer or spray or varnish, its viscosity is markedly reduced.

This divisional application will be devoted to the step of treating a nitrocellulose product of the character indicated with heat or heat and pressure, alone and in a substantially dry condition, i. e. before the addition of any liquid either solvent or non-solvent.

Furthermore the invention contemplates the heating of products of the character specified in a heat retaining and transmitting and oxygen excluding medium, such as sand, whereby waste nitrocellulose products, such as smokeless powder, for example, may be safely handled, it being well known that large quantities of this material are available substantially as scrap, since the close of the World War.

I have found that the heating of nitrocellulose products of the character indicated affect such marked changes in their characteristics as to render it possible to produce for use as varnishes or lacquers, having the treated material as a base, solutions containing as high as 100 ounces of nitrocellulose to a gallon of solvent liquid with a viscosity so low as to admit of their practical use for the purpose stated. Furthermore I have found that treatment of the nitrocellulose base material whether it be freshly nitrated cotton or scrap, such as celluloid scrap, motion picture film scrap, smokeless powder scrap or other nitrocellulose materials, permanently modifies the nature of the said nitrocellulose product in such manner as to render it more readily soluble in the liquid in which it is afterward to be dissolved for the purpose of making a nitrocellulose solution. In fact, this modification is so marked as to render the nitrocellulose soluble in liquids not commonly recognized as solvents thereof.

As an example of liquids not commonly recognized as solvents of nitrocellulose in the manufacture of lacquers and varnishes but which become solvents thereof when the nitrocellulose has been treated as described to permanently reduce its viscosity, I may mention ethyl alcohol or a mixture of ethyl alcohol and benzol. But it is to be understood that in so far as this application is concerned no solvent liquid is added to the nitrocellulose until after the nitrocellulose has been treated by my process, in a dry state.

The treatment of the nitrocellulose with heat or heat and pressure may be carried out under widely varying conditions and at widely varying temperatures and for widely varying periods of time. As a general proposition heating at higher temperatures lessens the time required to effect a given degree of reduction of viscosity. Therefore it is to be understood that the heating may be carried out at widely varying temperatures anywhere between 60° C. and the temperature at which the compound in question decomposes. The treatment of the material with heat and pressure may be advantageously carried out with some materials. An advantage of treating the material with pressure as well as heat is that the temperature is correspondingly raised and in addition the fact that the material is confined, as in an autoclave, for example, renders it possible to draw off any vapors of value. But with other materials, such as the smokeless powder, for example, the explosive nature of the material renders it undesirable to heat it under pressure, because smokeless powder is an explosive only when confined. At atmospheric pressure it will ignite and burn but will not explode. Therefore, when treating material of this nature, I preferably, do not confine it but merely heat at ordinary or atmospheric pressure, though I may advantageously embed it in sand or other granular or powdery material to such an extent as to exclude oxygen for the purposes of preventing ignition of the material. It follows as a natural result that the treatment of any nitrocellulose material, such as nitrocellulose scrap of the character above mentioned, containing residual solvents left from their initial manufacture will tend to drive off some of these residual solvents and will to that extent render the resultant product more brittle and less compressible than before treatment. Smokeless powder, for example, when treated by my process loses some of its residual solvent material and becomes dry and brittle, losing its normal compressibility and tending to break and crack when compressed.

While I may heat the nitrocellulose product at any temperature above 60° C. and with useful results, I find that the best results are obtained by heating the material above 100° C.

Where the scrap material contains residual solvents used during the initial manufacture of such material, I may recover such of these solvents as are of value by carrying out the heating in a closed vessel and withdrawing the solvents as they are released as vapors, subsequently condensing such vapors and recovering the solvents, which are frequently of value.

Having described my invention what I claim is:

The herein described process of treating nitrocellulose to reduce its viscosity when incorporated in a nitrocellulose solution which consists of embedding the nitrocellulose in a body of substantially dry protecting and heat transmitting material and then subjecting the whole to the action of heat.

In testimony whereof he affixes his signature.

GILBERT C. BACON.